United States Patent
White et al.

(10) Patent No.: US 9,327,825 B2
(45) Date of Patent: May 3, 2016

(54) ACTUATOR CONTROL SYSTEM

(75) Inventors: Nicholas White, Rochester (GB); Stephen Richard Morgan, Rochester (GB); John Kenneth Clarkstone, Rochester (GB)

(73) Assignee: BAE SYSTEMS plc, London (GB)

( * ) Notice: Subject to any disclaimer, the term of this patent is extended or adjusted under 35 U.S.C. 154(b) by 50 days.

(21) Appl. No.: 14/008,277

(22) PCT Filed: Mar. 22, 2012

(86) PCT No.: PCT/GB2012/050627
§ 371 (c)(1),
(2), (4) Date: Nov. 5, 2013

(87) PCT Pub. No.: WO2012/131330
PCT Pub. Date: Oct. 4, 2012

(65) Prior Publication Data
US 2014/0172203 A1  Jun. 19, 2014

(30) Foreign Application Priority Data
Mar. 29, 2011 (EP) .................................... 11275057
Mar. 29, 2011 (GB) .................................... 1105275.0

(51) Int. Cl.
*G05D 1/00* (2006.01)
*B64C 13/02* (2006.01)
*B64C 13/50* (2006.01)

(52) U.S. Cl.
CPC ............... *B64C 13/02* (2013.01); *B64C 13/503* (2013.01); *G05D 1/0077* (2013.01)

(58) Field of Classification Search
CPC .. B64C 19/00; B64C 13/503; B64C 2201/146
USPC ............................................................. 701/4
See application file for complete search history.

(56) References Cited

U.S. PATENT DOCUMENTS 3,440,504 A * 4/1969 Mehelich et al. ............. 318/563
3,679,156 A * 7/1972 Redmond, Jr. ....... G05D 1/0077
244/194

(Continued)

FOREIGN PATENT DOCUMENTS

| DE | 10 2006 039 671 A1 | 3/2008 |
|---|---|---|
| EP | 0 573 106 A1 | 12/1993 |
| EP | 1 036 734 A2 | 9/2000 |
| EP | 2 338 789 A2 | 6/2011 |

OTHER PUBLICATIONS

International Search Report (PCT/ISA/210) mailed on May 22, 2012, by the British Patent Office as the International Searching Authority for International Application No. PCT/GB2012/050627.

(Continued)

*Primary Examiner* — Behrang Badii
*Assistant Examiner* — Daniel L Greene
(74) *Attorney, Agent, or Firm* — Finch & Maloney PLLC

(57) ABSTRACT

An actuator control system for coupling to one or more flight control computers (FCCs); comprising: apparatus for controlling an aerodynamic control surface in response to commands received from one or more FCCs, and, integrated with the controlling apparatus, a failure protection system comprising apparatus arranged to provide at least one of the following functionalities: a servo monitor functionality, a command monitor functionality, and a loop closure functionality. Thus, in the overall flight control system, some or all of the elements of the failure protection system are located in the actuator control stage.

17 Claims, 7 Drawing Sheets

(56) References Cited

U.S. PATENT DOCUMENTS

| | | | |
|---|---|---|---|
| 5,493,497 A | 2/1996 | Buus | |
| 5,806,805 A | 9/1998 | Elbert et al. | |
| 2003/0120399 A1 | 6/2003 | Yamamoto | |
| 2006/0198737 A1 | 9/2006 | Matsui et al. | |
| 2007/0033195 A1* | 2/2007 | Stange et al. | 707/10 |
| 2009/0222148 A1* | 9/2009 | Knotts | G05D 1/0038 701/2 |
| 2010/0318245 A1 | 12/2010 | Nakagawa et al. | |
| 2011/0066305 A1* | 3/2011 | Lin et al. | 701/3 |

OTHER PUBLICATIONS

Search Report dated Jul. 21, 2011.
European Search Report dated Aug. 23, 2011.
Written Opinion (PCT/ISA/237) mailed on May 22, 2012, by the British Patent Office as the International Searching Authority for International Application No. PCT/GB2012/050627.
Notification Concerning Transmittal of International Preliminary Report on Patentability (PCT/IB/326).
International Preliminary Report on Patentability (PCT/IB/373).

\* cited by examiner

ACTUATOR CONTROL SYSTEM

FIELD OF THE INVENTION

The present invention relates to an actuator control system, in particularly, but not exclusively, an actuator control system for coupling one or more flight control computers and includes a failure protection system, a flight control system incorporating an actuator control system and an actuator control method for controlling an aerodynamic control surface using a flight control system.

BACKGROUND

Conventionally, hydraulic actuators have been the main choice for use for positioning aerodynamic control surfaces of aircraft. Another type of actuator for positioning control surfaces of an aircraft is an electromechanical actuator.

Failure protection systems for flight control systems that include actuator control systems, where the actuators are hydraulic actuators, are well known. Such systems incorporate redundancy, and use, for example, a loop closure function, a command monitor function, and a servo monitoring function, arranged in conventional configurations, and located in conventional positions within an overall flight control system. However, such conventional failure protection systems are not fully suitable for flight control systems where the actuators are electromechanical actuators. This lack of full suitability is exacerbated in the case of actuators for positioning control surfaces of an unmanned air vehicle (UAV).

Lack of full suitability derives, at least in part, from differences between how hydraulic actuators function compared to how electromechanical actuators function. For example, electromechanical actuators are more prone to jam in safety-critical positions.

SUMMARY OF THE INVENTION

The present inventors have realised it would be desirable to provide failure protection systems adapted to be more suitable for electromechanical actuators.

The present inventors have further realised it would be desirable, in at least some implementations, to arrange the above mentioned functions in configurations more suitable for use with electromechanical actuators.

The present inventors have further realised it would be desirable, in at least some implementations, to locate one or more of the above mentioned functions at new positions within an overall flight control system in order to make use of the presence of electromechanical actuators as opposed to hydraulic actuators.

In a first aspect, the present invention provides an actuator control system for coupling to one or more flight control computers, flight control computers hereinafter being referred to as FCCs; the actuator control system comprising: apparatus for controlling an aerodynamic control surface in response to commands received from one or more FCCs, and, integrated with the controlling apparatus, a failure protection system comprising apparatus arranged to provide at least one of the following functionalities: a servo monitor functionality, a command monitor functionality, and a loop closure functionality.

The failure protection system may comprise apparatus arranged to provide at least the loop closure functionality.

The failure protection system may comprise apparatus arranged to provide at least the command monitor functionality.

The failure protection system may comprise apparatus arranged to provide at least the servo monitor functionality.

The failure protection system may comprise apparatus arranged to provide a cross channel sever functionality.

The aerodynamic control surface may be part of an unmanned air vehicle.

The actuator control system may be for controlling one or more electromechanical actuators.

In a further aspect, the present invention provides a flight control system comprising: plural FCCs coupled to an actuator control system according to any of the above aspects.

The flight control system may be arranged such that in operation the only signals that pass from the FCCs to the actuator control system are control command signals.

The flight control system may be arranged such that in operation the only signals that pass from the actuator control system to the FCCs are control position signals.

In a further aspect, the present invention provides an actuator control method for controlling an aerodynamic control surface using a flight control system, wherein the flight control system comprises plural flight control computers, hereinafter referred to as FCCs, located in an FCC stage, and an actuator stage; the method comprising: performing failure protection by performing servo monitoring, command monitoring, and loop closure function; wherein at least one of the servo monitoring, command monitoring, and loop closure function are performed in the actuator stage. Specifically it may be the loop closure function that is performed in the actuator stage. Alternatively, the servo monitoring, command monitoring and loop closure function may be performed in the actuator stage.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the preceding aspect.

BRIEF DESCRIPTION OF THE DRAWINGS

The invention will now be described, by way of example only, with reference to the accompanying drawings, in which.

DETAILED DESCRIPTION

Figure 1:
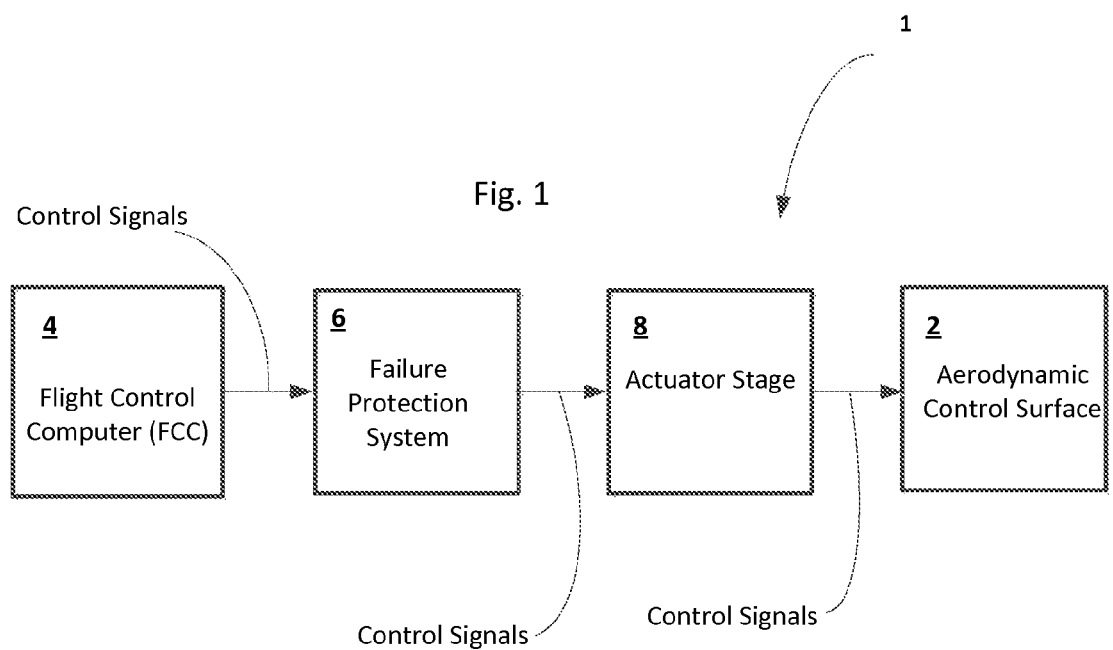
FIG. 1 is a schematic illustration of how divisions in functionality may be represented for a flight control system according to the invention.

FIG. 1 is a schematic illustration of how divisions in functionality may be represented for a flight control system 1, for controlling an aerodynamic control surface 2, for example an elevator, aileron, or rudder, of an unmanned air vehicle (UAV). The flight control system 1 comprises a flight control computer (FCC) stage 4, a failure protection system 6, and an actuator stage 8.

In operation, in overview, the FCC stage 4 provides original control signals related to the required flight of the UAV; the failure protection system 6 modifies, redistributes and monitors these signals to provide failure protection including redundancy; and the actuator stage 8 uses the modified signals to drive the movement of the position of the surface 2.

Figure 2:
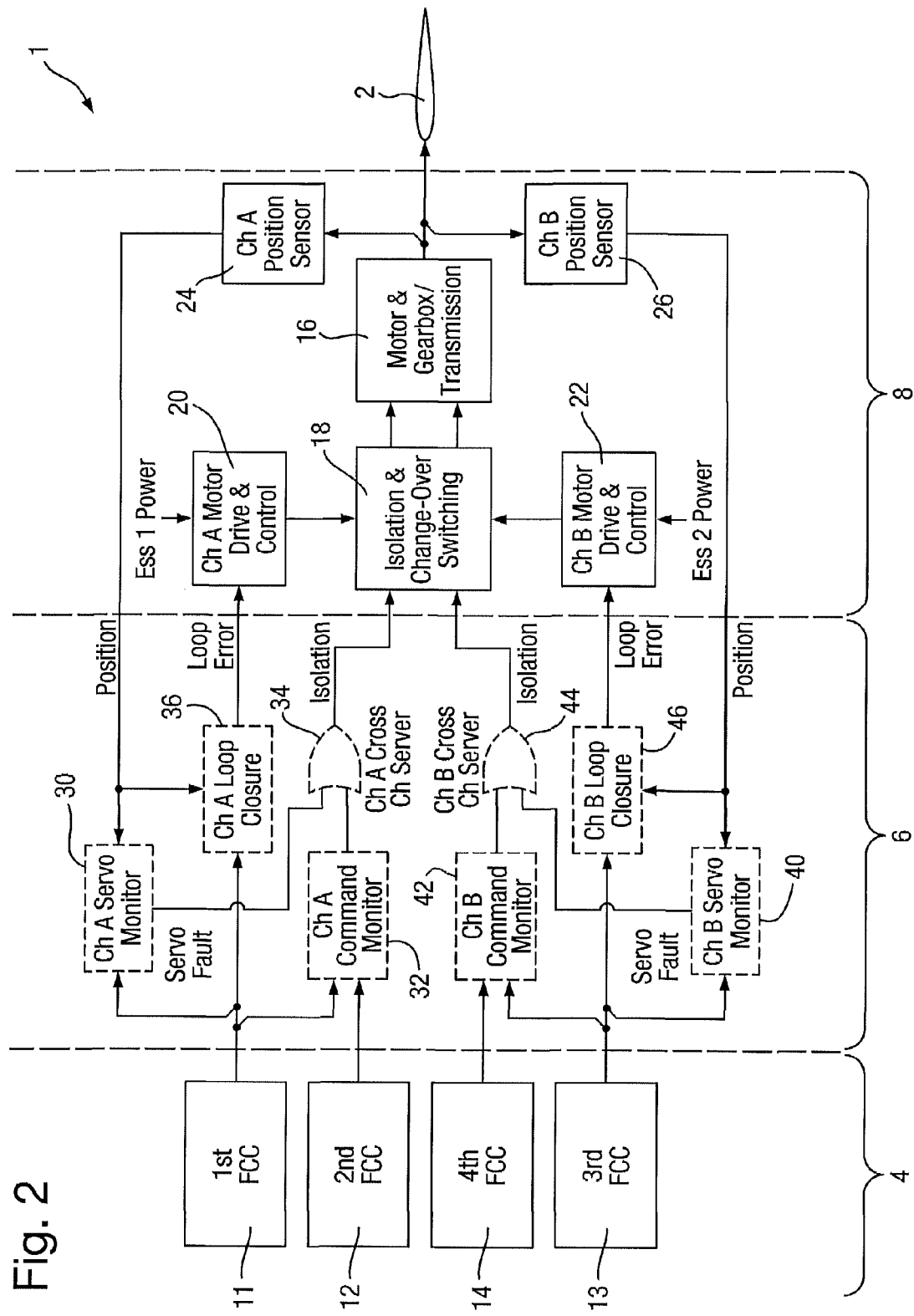
FIG. 2 is a schematic illustration of a first flight control system according to the invention as illustrated in FIG. 1 showing certain elements in greater detail.

FIG. 2 is a schematic illustration of the flight control system 1 showing the above mentioned elements in greater detail.

In this example, the FCC stage 4 comprises four separate FCC's, namely a first FCC 11, a second FCC 12, a third FCC 13, and a fourth FCC 14. Each of the FCC's outputs command signals that, in perfect operating conditions, i.e. no faults present, would be the same, or at least approximately the same, for each FCC. As will be explained in more detail later below, the failure protection system 6 and the actuator stage 8 in effect process the output command signals as two pairs of outputs, the first pair being from the first FCC 11 and the second FCC 12, the second pair being from the third FCC 13 and the fourth FCC 14. Of the first pair, the command signal from the first FCC 11 is primarily used by the failure protection system 6 and the actuator stage 8 as the primary drive signal for a first channel (hereinafter referred to as "channel A") of the actuator stage 8, whereas the command signal from the second FCC 12 is primarily used by the failure protection system 6 and the actuator stage 8 as a comparison signal for command monitoring purposes in channel A. Correspondingly, of the second pair, the command signal from the third FCC 13 is primarily used by the failure protection system 6 and the actuator stage 8 as the primary drive signal for a second channel (hereinafter referred to as "channel B") of the actuator stage 8, whereas the command signal from the fourth FCC 14 is primarily used by the failure protection system 6 and the actuator stage 8 as a comparison signal for command monitoring purposes in channel B.

In this example, the actuator stage 8 comprises two channels (the previously mentioned channel A and channel B) of electronics driving a single motor (represented in FIG. 2 as part of a combined motor and gearbox/transmission module 16). The motor has duplex windings or alternatively two motors on a common shaft. The motor output is connected to the surface 2 via a single reduction gearbox and transmission (represented in FIG. 2 as part of the combined motor and gearbox/transmission module 16), the motor output may be arranged to generate a linear force to, for example, a horn so as to develop a surface hinge moment. Only one set of windings is active at any instant. The active channel is selected via two isolation inputs that can engage channel A, channel B or neither channel. Since the engaged channel should not be affected by failure in the disengaged channel, the isolation logic incorporates a latch to ensure that the disengaged channel can only be engaged once the previously engaged channel has become disengaged. The motor phase currents are generated by the motor drive function that inverts the DC motor power input into a set of AC phase currents. The amplitude, frequency and phase of the AC currents are controlled by high-speed digital processor functionality supplying Pulse-Width Modulation signals to transistors in the motor drive. In this example, one such processor functionality is included in the channel A motor drive and control module 20 (described later below) and one such processor functionality is included in the channel B motor drive and control module 22 (described later below). This commutation and control function accepts a position error input and calculates a current command to produce a motor torque that will act to reduce the actuator loop error. The shaft resolver ensures that the motor is correctly commutated as it rotates. The amplitude of the phase currents is feedback to the commutation and control function to ensure that the required current is developed against the back EMF generated by the motor itself. In addition to the external isolation inputs, the commutation and control function can also isolate the motor from the drive in the event that its in-line monitoring function detects a fault. The position of the actuator output is sensed to allow the loop error to be deduced and allow the end-to-end operation of the actuator to be monitored (as will be described in more detail later below in relation to the below described loop closure function). The two channels are powered from different bus-bars allowing the actuator to continue to operate when one bus-bar is lost. The commutation and control function is powered from a high quality 28 Volt aircraft supply. The motor drive with its associated control intrinsically regulates the motor currents in the face of supply voltage variation and do not need the same quality of supply as the rest of the electronics. In addition a higher voltage motor supply would allow the use of lighter gauge wires to the actuator. For these reasons provision may be made to enable the motor power to be supplied separately.

In addition to the motor and gearbox/transmission module 16 mentioned above, the actuator stage 8 further comprises an isolation and change-over switching module 18, a first motor drive and control module 20 (hereinafter referred to as the "channel A motor drive and control module" 20), a second motor drive and control module 22 (hereinafter referred to as the "channel B motor drive and control module" 22), a first position sensor 24 (hereinafter referred to as the "channel A position sensor 24), and a second position sensor 26 (hereinafter referred to as the "channel B position sensor 26").

The isolation and change-over switching module 18 is coupled so as to receive the following outputs: isolation outputs from the failure protection system 6, a motor drive and control output from the channel A motor drive and control module 20, and a motor drive and control output from the channel B motor drive and control module 22. The isolation and change-over switching module 18 is further coupled to the motor and gearbox/transmission module 16 to provide driving outputs, corresponding to the above described operational details of the actuator stage 8, including those described above, i.e. in operation, the isolation and change-over switching module 18 performs, as appropriate, functions as described above in respect of actuator stage 8.

The output of the motor and gearbox/transmission module 16 is coupled to the surface 2. In operation, the motor and gearbox/transmission module 16 provides the forces to move the position of the surface 2 according to the driving outputs received from the isolation and change-over switching module 18.

An input of the channel A position sensor 24 is coupled to a linkage providing the coupling between the output of the motor and gearbox/transmission module 16, or otherwise arranged, to sense a condition that is indicative of the actuator output position which is therefore also indicative of the position of the surface 2. Any suitable condition may be sensed. In this example the channel A position sensor 24 is positioned to sense the rotational position of a rod (not shown) linking the motor and gearbox/transmission module 16 to the surface 2. Another possibility is to sense the linear displacement of a ball-screw jack.

An output of the channel A position sensor 24 is coupled to output a position signal, i.e. a signal indicative of the position of the surface 2, in relation to channel A, to the failure protection system 6.

The channel A motor drive and control module 20, in addition to having an output coupled to the isolation and change-over switching module 18 as described above, also has an input coupled to an output of the failure protection system 6 for receiving, from the failure protection system 6, a loop error signal relating to channel A. The loop error signal will be described in more detail later below. The channel A motor drive and control module 20 receives power from a first power supply line.

Turning now to channel B, an input of the channel B position sensor 26 is coupled to a linkage providing the coupling between the output of the motor and gearbox/transmission module 16, or otherwise arranged, to sense a condition that is indicative of the position of the surface 2. Any suitable condition may be sensed. In this example the channel B position sensor 26 is positioned to sense the rotational position of a rod (not shown) linking the motor and gearbox/transmission module 16 to the surface 2. Another possibility is to sense the linear displacement of a ball-screw jack.

An output of the channel B position sensor 26 is coupled to output a position signal, i.e. a signal indicative of the actuator output position which is therefore also indicative of the position of the surface 2, in relation to channel B, to the failure protection system 6.

The channel B motor drive and control module 22, in addition to having an output coupled to the isolation and change-over switching module 18 as described above, also has an input coupled to an output of the failure protection system 6 for receiving, from the failure protection system 6, a loop error signal relating to channel B. The loop error signal will be described in more detail later below. The channel B motor drive and control module 22 receives power from a second power supply line that is independent of the above mentioned first power supply line supplying the channel A motor drive and control module 20.

In this example, the failure protection system implements a loop closure function, a command monitor function, a servo monitoring function, and a cross channel sever function. In overview, these functions perform the following:

The loop closure function compares the surface position demanded by the FCC control laws with the actuator output position and calculates a motor torque command to cause the actuator to track the FCC command.

The command monitor function checks the command output of the FCC controlling the actuator with the same signal output from one or more other FCC channels.

The servo monitoring function checks that the actuator is tracking the FCC commanded position correctly.

The cross channel sever function of a given channel instructs the actuator stage 8 to isolate that channel in the event of determining a relevant fault condition.

If the command output is found to be in error or the actuator fails to track its command correctly, the associated actuator channel is isolated and control transferred to another FCC using the remaining channel of the actuator.

In this example these functions, are arranged and implemented as shown in FIG. 2, i.e. as follows.

The following modules are provided for channel A: a first servo monitor 30 module (hereinafter referred to as the "channel A servo monitor module" 30), a first command monitor module 32 (hereinafter referred to as the "channel A command monitor module" 32), a first cross channel sever module 34 (hereinafter referred to as the "channel A cross channel sever module" 34), and a first loop closure module 36 (hereinafter referred to as the "channel A loop closure module" 36).

A first input of the channel A servo monitor module 30 is coupled to the output of the first FCC 11 so as to receive the above mentioned command signals output by the first FCC 11. A second input of the channel A servo monitor module 30 is coupled to the output of the channel A position sensor 24 so as to receive the above mentioned position signal from the channel A position sensor 24. An output of the channel A servo monitor module 30 is coupled to a first input of the channel A cross channel sever module 34, to allow a first channel A cross channel sever signal to be provided to the channel A cross channel sever module 34.

A first input of the channel A command monitor 32 is coupled to the output of the first FCC 11 so as to receive the above mentioned command signals output by the first FCC 11. A second input of the channel A command monitor 32 is coupled to the output of the second FCC 12 so as to receive the above mentioned command signals output by the second FCC 12. An output of the channel A command monitor module 32 is coupled to a second input of the channel A cross channel sever module 34, to allow a second channel A cross channel sever signal to be provided to the channel A cross channel sever module 34.

In addition to the inputs mentioned above, the channel A cross channel sever module 34 further comprises an output coupled to the previously mentioned input of the isolation and change-over switching module 18 for outputting one of the above mentioned isolation outputs to the isolation and change-over switching module 18. The status of the isolation output is dependent upon the channel A cross channel sever signals received by the channel A cross channel sever module 34. In this example, if either of those signals indicates a fault then the isolation output is one instructing the isolation and change-over switching module 18 to isolate channel A from the driving of the motor and gearbox/transmission module 16.

A first input of the channel A loop closure module 36 is coupled to the output of the first FCC 11 so as to receive the above mentioned command signals output by the first FCC 11. A second input of the channel A loop closure module 36 is coupled to the output of the channel A position sensor 24 so as to receive the above mentioned position signal from the channel A position sensor 24. An output of the channel A loop closure module 36 is coupled to a first input of the channel A motor drive and control module 20, to allow a channel A loop error signal to be provided to the channel A motor drive and control module 20.

The following modules are provided for channel B: a second servo monitor 40 module (hereinafter referred to as the "channel B servo monitor module" 40), a second command monitor module 42 (hereinafter referred to as the "channel B command monitor module" 42), a second cross channel sever module 44 (hereinafter referred to as the "channel B cross channel sever module" 44), and a second loop closure module 46 (hereinafter referred to as the "channel B loop closure module" 46).

A first input of the channel B servo monitor module 40 is coupled to the output of the third FCC 13 so as to receive the above mentioned command signals output by the third FCC 13. A second input of the channel B servo monitor module 40 is coupled to the output of the channel B position sensor 26 so as to receive the above mentioned position signal from the channel B position sensor 26. An output of the channel B servo monitor module 40 is coupled to a first input of the channel B cross channel sever module 44, to allow a first channel B cross channel sever signal to be provided to the channel B cross channel sever module 44.

A first input of the channel B command monitor 42 is coupled to the output of the third FCC 13 so as to receive the above mentioned command signals output by the third FCC 13. A second input of the channel B command monitor 42 is coupled to the output of the fourth FCC 14 so as to receive the above mentioned command signals output by the fourth FCC 14. An output of the channel B command monitor module 42 is coupled to a second input of the channel B cross channel sever module 44, to allow a second channel B cross channel sever signal to be provided to the channel B cross channel sever module 44.

In addition to the inputs mentioned above, the channel B cross channel sever module 44 further comprises an output coupled to the previously mentioned input of the isolation and change-over switching module 18 for outputting one of the above mentioned isolation outputs to the isolation and change-over switching module 18. The status of the isolation output is dependent upon the channel B cross channel sever signals received by the channel B cross channel sever module 44. In this example, if either of those signals indicates a fault then the isolation output is one instructing the isolation and change-over switching module 18 to isolate channel B from the driving of the motor and gearbox/transmission module 16.

A first input of the channel B loop closure module 46 is coupled to the output of the third FCC 13 so as to receive the above mentioned command signals output by the third FCC 13. A second input of the channel B loop closure module 46 is coupled to the output of the channel B position sensor 26 so as to receive the above mentioned position signal from the channel B position sensor 26. An output of the channel B loop closure module 46 is coupled to a first input of the channel B motor drive and control module 22, to allow a channel B loop error signal to be provided to the channel B motor drive and control module 22.

In the above described example individual surface actuators are capable of absorbing the failure of a single aircraft bus-bar and the failure of a single channel of actuator electronics.

Further details of the loop closure function are as follows. The loop closure function may be viewed as an extension of either control law processing already performed in the FCC stage 4 or the motor control processing already performed by the actuator stage 8. The loop closure function is preferably implemented as more complex than a simple difference function and may then include some form of actuator specific dynamic compensation. The present inventors have realised that therefore it is advantageous to locate the loop closure function with the processing of the actuator stage 8. The bandwidth of the control required for the loop closure function will tend to be higher than that required for the UAV, and processing the loop closure function anywhere other than the actuator stage 8 itself would require higher capacity links between the actuator stage 8 and FCC stage 4. A further advantage achieved by locating the loop closure in the actuator stage 8 is that it avoids the need to export the position sensor excitation from the FCC stage 4 and for the FCC stage 4 to demodulate and condition the position signals output by the position sensors 24, 26.

Embodiments of the invention will now be described. In these embodiments, some or all of the above described functionalities of the failure protection system 6 are located and/or integrated (i.e. functionally integrated) in the actuator stage 8 to provide an actuator control system. The actuator control system is thus a system that is for coupling to the FCCs in order to receive commands from the FCCs in response to which it controls the aerodynamic control surface. Nevertheless, in these embodiments, the same or equivalent overall functionality to that described above with reference to FIGS. 1 and 2 is still achieved, except where stated otherwise.

Figure 3:
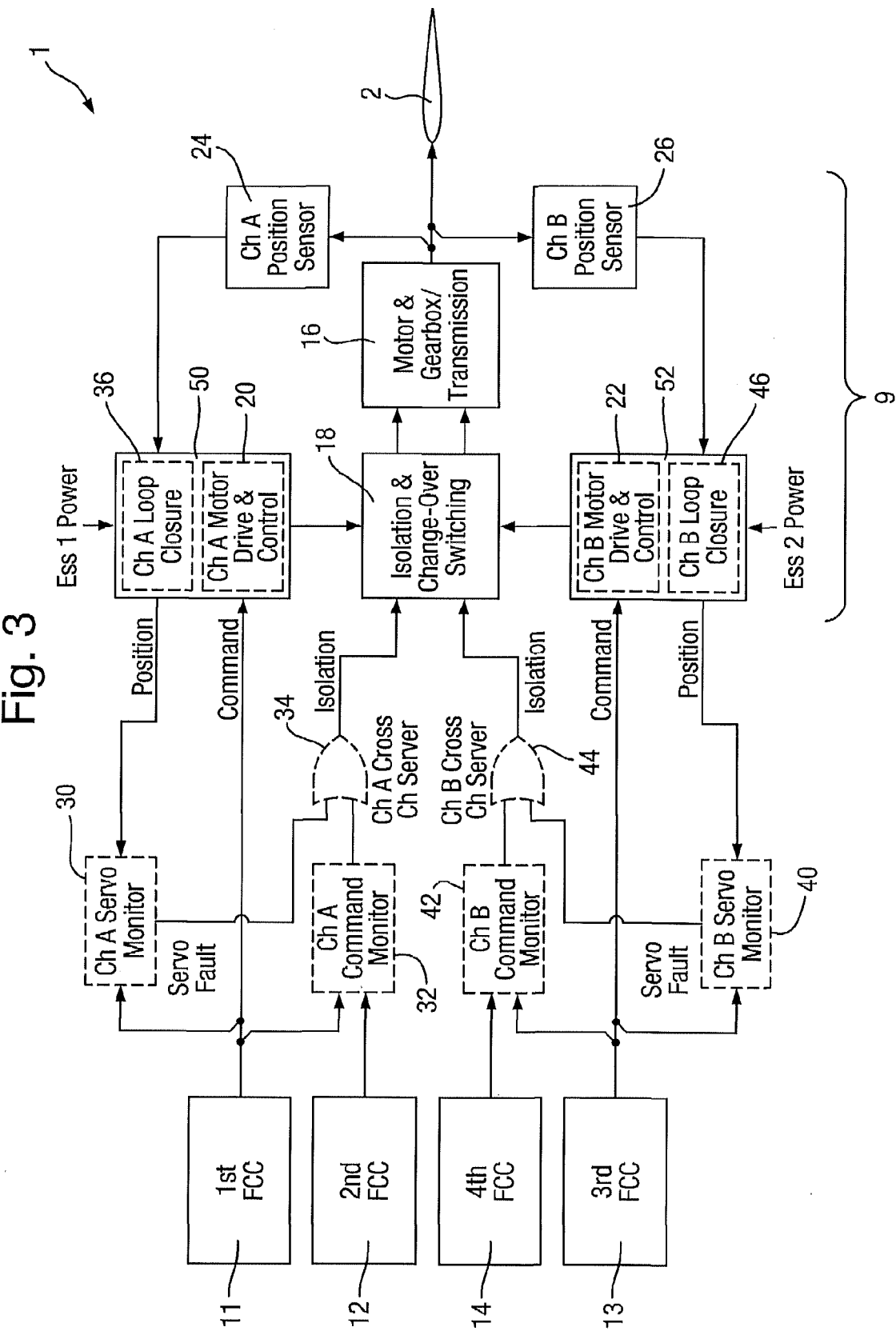
FIGS. 3 to 7 are schematic illustrations of alternative flight control systems according to the invention.

FIG. 3 is a schematic illustration of an embodiment of a flight control system 1 for controlling an aerodynamic control surface 2, for example an elevator, aileron, or rudder, of an unmanned air vehicle (UAV), i.e. in the embodiment shown in FIG. 3, the loop closure function is collocated and functionally integrated with the actuator stage 8, to provide an actuator control system 9. In the embodiment of FIG. 3, the flight control system 1 comprises the same elements (indicated by the same reference numerals), and the elements are coupled together and perform the same functions, as in the example described above with reference to FIGS. 1 and 2, except where stated otherwise below.

In this embodiment, the channel A loop closure module 36 is collocated with the channel A motor drive and control module 20, to provide a first combined loop closure and motor drive-control module 50 (hereinafter referred to as the "channel A combined loop closure and motor drive-control module" 50).

Also, in this embodiment, the channel B loop closure module 46 is collocated with the channel B motor drive and control module 22, to provide a second combined loop closure and motor drive-control module 52 (hereinafter referred to as the "channel B combined loop closure and motor drive-control module" 52).

Thus in this embodiment the actuator control system 9 comprises the following in combination: the combined loop closure and motor drive-control modules 50 and 52, the isolation and change-over switching module 18, the motor and gearbox/transmission module 16, and the position sensors 24 and 26.

Also, in this embodiment, the position signals output by the respective position sensors 24, 26 are now passed by the respective combined loop closure and motor drive-control modules 50, 52 to the respective servo monitors 30, 40.

In this embodiment, the other functional modules (i.e. the servo monitor modules 30 and 40, the command monitor modules 32 and 42, and the cross channel sever modules 34 and 44) may be located in any appropriate location, for example with or as part of the FCCs or located as a separate entity between the FCCs and the actuator stage.

Further details of the command monitor function are as follows. The command monitor function is configured to be independent of the command FCC. If the command monitor function were hosted in a single FCC, the four FCC channels would become paired in a cyclic command-monitor arrangement. This arrangement would only be capable of surviving one FCC failure, or perhaps two if in-line self-monitoring were used to inhibit command and monitor. The present inventors have realised that if an FCC channel suffered a hard failure that was detected by its own in-line self-monitoring it would isolate itself from the actuators it controlled. The effect of this would be that the standby channels in the affected actuators would take-over control of the surfaces and the initial fault would tend to be completely absorbed. A further consequence of the original fault is that the failed FCC channel would inhibit its cross lane sever on another FCC channel. If this channel suffered an undetected hard failure, or more likely a soft failure, the combination of faults would tend to be a catastrophic. The present inventors have realised that accordingly it would be advantageous to provide further embodiments in which the command monitor function is collocated with the processing of the FCC stage 4, and in which preferably the command monitor function is hosted in three FCC channels and the verdicts voted in hardware that is segregated from all the FCC channels.

Figure 4:
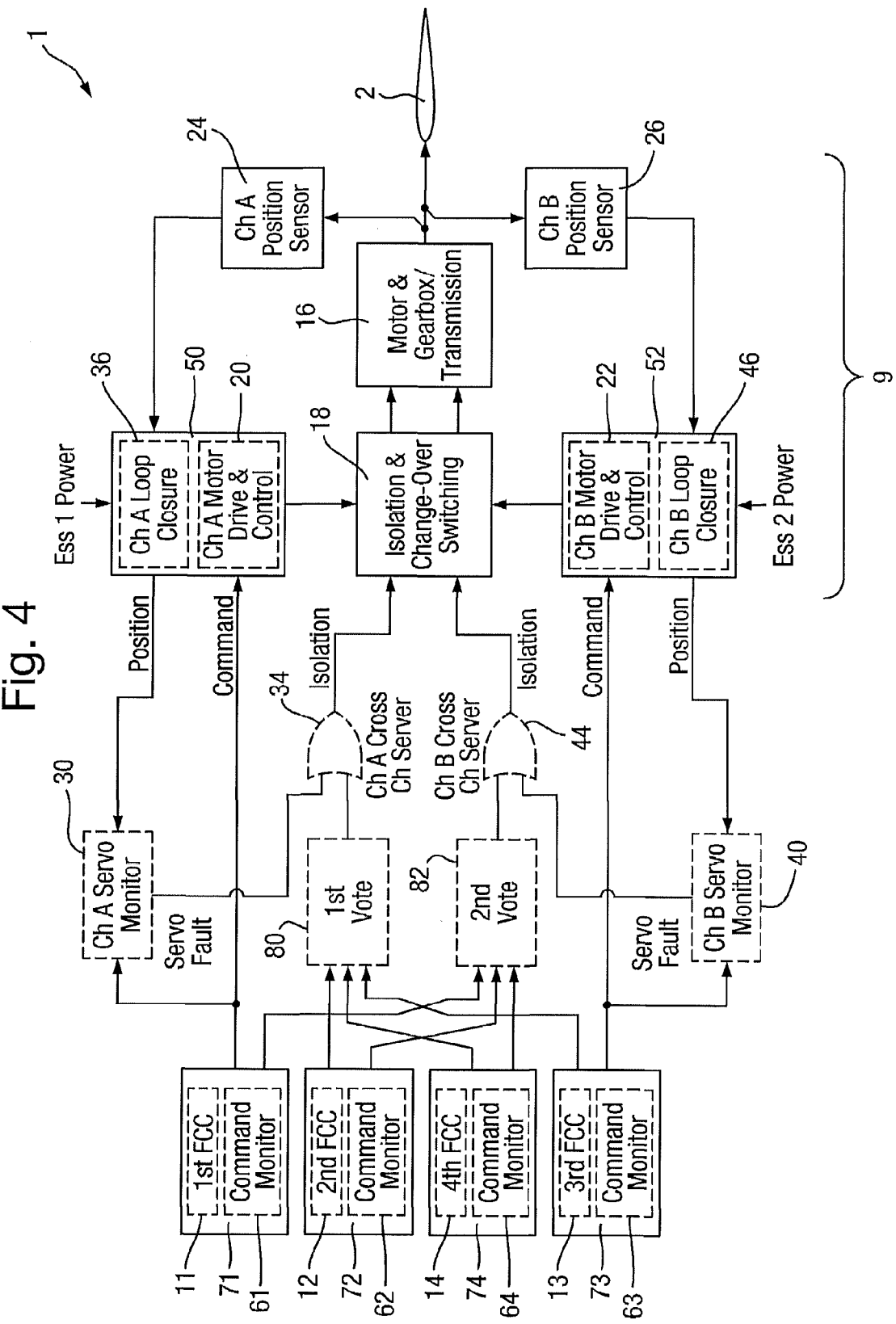

FIG. 4 is a schematic illustration of one such further embodiment of a flight control system 1 for controlling an aerodynamic control surface 2, for example an elevator, aileron, or rudder, of an unmanned air vehicle (UAV), i.e. in the further embodiment shown in FIG. 4, the command monitor function is collocated with the FCC stage 4. In the further embodiment of FIG. 4, the flight control system 1 comprises the same elements (indicated by the same reference numerals), and the elements are coupled together and perform the same functions, as in the further embodiment described above with reference to FIG. 3, except where stated otherwise below.

In this further embodiment, the channel A command monitor module 32 and the channel B command monitor module 42 are omitted, and their functionality is instead performed by the following modules located in the FCC stage 4: a first command monitor module 61, a second command monitor module 62, a third command monitor module 63, and a fourth command monitor module 64. The first command monitor module 61 is collocated with the first FCC 11, to provide a first combined FCC and command monitor module 71. The second command monitor module 62 is collocated with the second FCC 12, to provide a second combined FCC and command monitor module 72. The third command monitor module 63 is collocated with the third FCC 13, to provide a third combined FCC and command monitor module 73. The fourth command monitor module 64 is collocated with the fourth FCC 14, to provide a fourth combined FCC and command monitor module 74.

Also, a first vote module 80, and a second vote module 82, are provided. The first vote module 80 is configured to receive respective input signals from the second command monitor module 62, the third command monitor module 63 and the fourth command monitor module 64. The first vote module 80 is further configured to provide an output signal to the channel A cross channel sever module 34 (this signal is equivalent to the signal output from the channel A command monitor module 32 to the channel A cross channel sever module 34 in the earlier described embodiments).

The second vote module 82 is configured to receive respective input signals from the first command monitor module 61, the second command monitor module 62, and the fourth command monitor module 64. The second vote module 82 is further configured to provide an output signal to the channel B cross channel sever module 44 (this signal is equivalent to the signal output from the channel B command monitor module 42 to the channel B cross channel sever module 44 in the earlier described embodiments).

These vote modules 80, 82 perform conventional vote and/or vote/monitoring functionality. For example, in this further embodiment, if any of the input signals indicate a fault condition, then the vote module outputs a signal instructing the cross channel sever module to itself issue a channel isolating/severing instruction to the isolation and change-over switching module 18.

In this further embodiment of FIG. 4, the second command monitor module 62, the third command monitor module 63, the fourth command monitor module 64 and the first vote module 80 in combination perform the functionality performed by the channel A command monitor module 32 of the earlier described embodiments. Correspondingly, in this further embodiment of FIG. 4, the first command monitor module 61, the second command monitor module 62, the fourth command monitor module 64 and the second vote module 82 in combination perform the functionality performed by the channel B command monitor module 42 of the earlier described embodiments. In this manner, the command monitoring of a given FCC is performed only by command monitor modules that are located at FCC's other than the FCC being monitored.

In this further embodiment, the other functional modules (i.e. the servo monitor modules 30 and 40, and the cross channel sever modules 34 and 44) and the vote modules 80 and 82 may be located in any appropriate location, for example with or as part of the FCCs or located as a separate entity between the FCCs and the actuator stage.

In further embodiments, as an alternative to the FCC channels implementing a cross channel sever, the actuator processing hosts the command monitor by receiving commands from multiple FCC channels. This enables the actuator to absorb FCC failures and avoid the need to rely upon FCC self-monitoring. Erroneous selection of an FCC command is protected by the servo monitor function.

Figure 5:
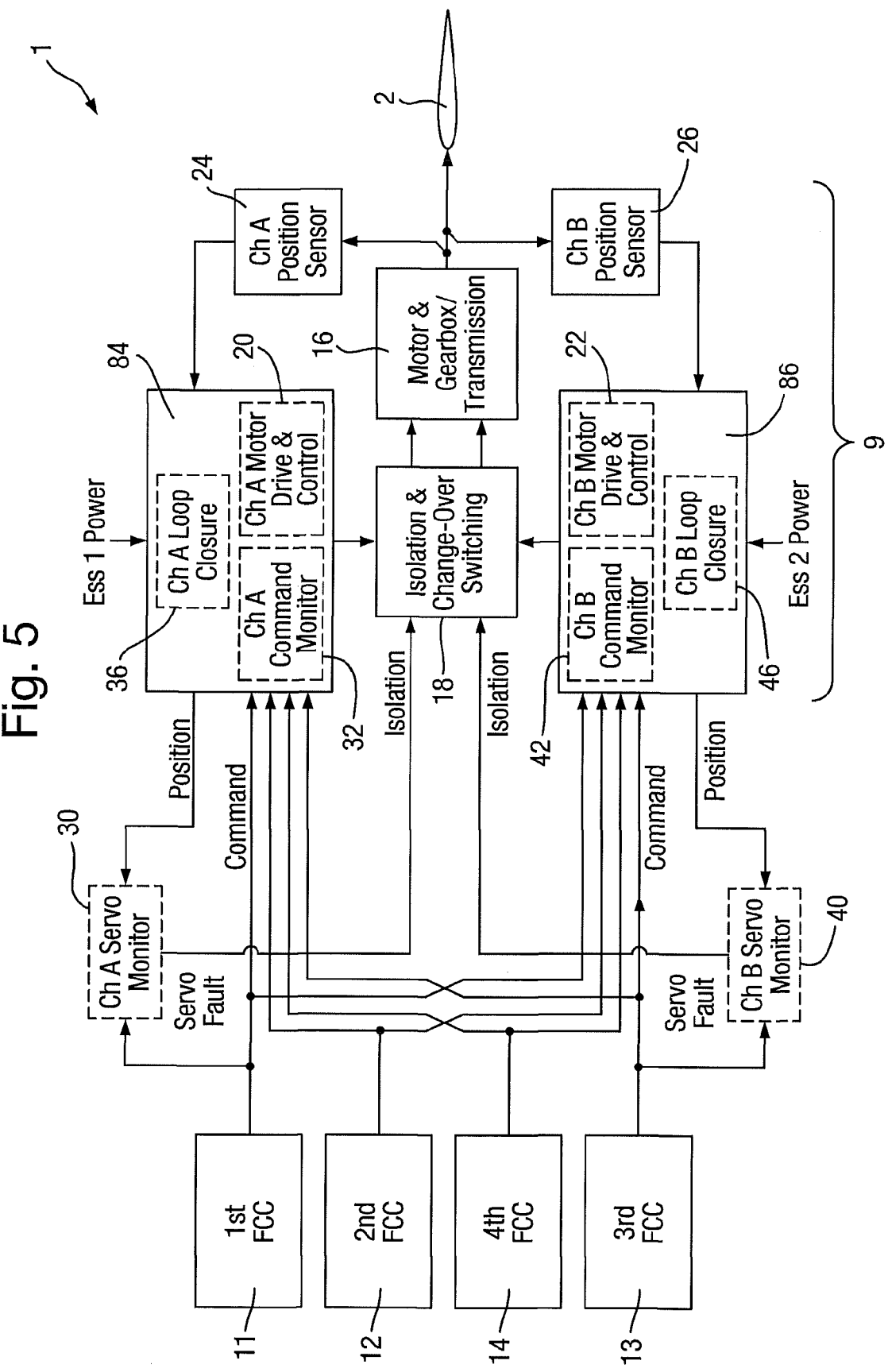

FIG. 5 is a schematic illustration of one such further embodiment of a flight control system 1 for controlling an aerodynamic control surface 2, for example an elevator, aileron, or rudder, of an unmanned air vehicle (UAV), i.e. in the further embodiment shown in FIG. 5, actuator processing hosts the command monitor by receiving commands from multiple FCC channels. As part of this, additionally the command monitor function is collocated with the actuator stage 8 to provide a further version of the actuator control system 9. In the further embodiment of FIG. 5, the flight control system 1 comprises the same elements (indicated by the same reference numerals), and the elements are coupled together and perform the same functions, as in the further embodiment described above with reference to FIG. 3, except where stated otherwise below.

In this further embodiment, the channel A command monitor 32 and the channel A loop closure module 36 are collocated with the channel A motor drive and control module 20, to provide a first combined loop closure/command monitor/motor drive-control module 84 (hereinafter referred to as the "channel A combined loop closure/command monitor/motor drive-control module" 84).

Also, in this further embodiment, the channel B command monitor 42 and the channel B loop closure module 46 are collocated with the channel B motor drive and control module 22, to provide a second combined loop closure/command monitor/motor drive-control module 86 (hereinafter referred to as the "channel B combined loop closure/command monitor/motor drive-control module" 86).

Thus in this embodiment the actuator control system 9 comprises the following in combination: the combined loop closure/command monitor/motor drive-control modules 84 and 86, the isolation and change-over switching module 18, the motor and gearbox/transmission module 16, and the position sensors 24 and 26.

Also, in this further embodiment, the cross channel sever modules 34, 44 are omitted.

In this further embodiment, the other functional modules (i.e. the servo monitor modules 30 and 40) may be located in any appropriate location, for example with or as part of the FCCs or located as a separate entity between the FCCs and the actuator stage.

Further details of the servo monitor function are as follows. In the above embodiments, under fault-free conditions each FCC channel commands three active actuator channels. If an FCC channel suffered an undetected hard failure that inhibited one or more servo monitors, but this failure was not apparent to the command monitors, this would leave the system unprotected in the event of a subsequent actuator failure. The present inventors have realised that accordingly it would be advantageous to provide further embodiments in which the servo monitor function is collocated with the FCC stage 4, for example in which the servo monitor is hosted in three FCC channels and the verdicts voted in hardware that is segregated from all the FCC channels.

Figure 6:
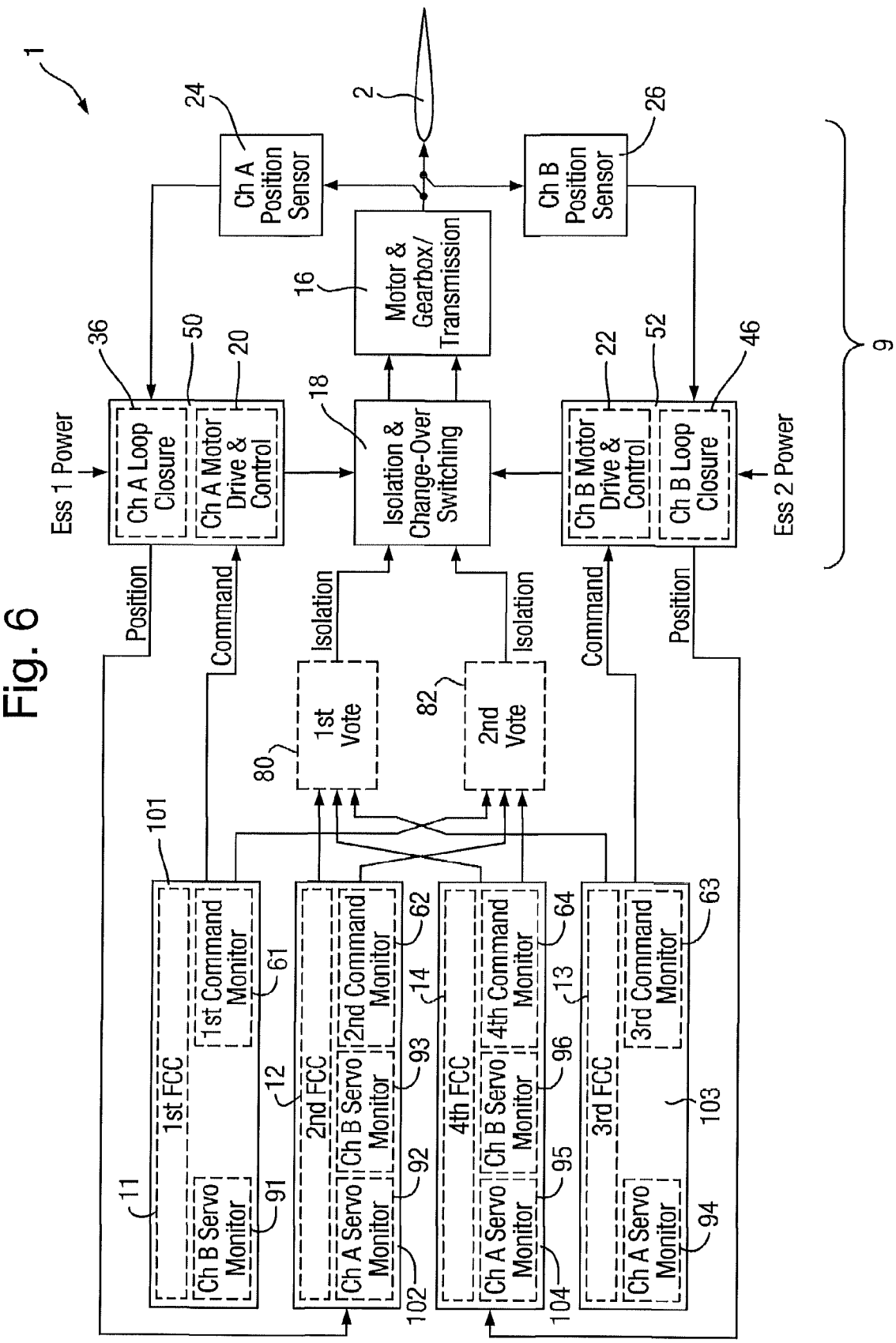

FIG. 6 is a schematic illustration of one such further embodiment of a flight control system 1 for controlling an aerodynamic control surface 2, for example an elevator, aileron, or rudder, of an unmanned air vehicle (UAV), i.e. in the further embodiment shown in FIG. 6, the servo monitor function is collocated with the FCC stage 4, for example the servo monitor function is hosted in three FCC channels and the verdicts voted in hardware that is segregated from all the FCC channels. In the further embodiment of FIG. 6, the flight control system 1 comprises the same elements (indicated by the same reference numerals), and the elements are coupled together and perform the same functions, as in the further embodiment described above with reference to FIG. 4, except where stated otherwise below.

In this further embodiment, the channel A servo monitor module 30 and the channel B servo monitor module 40 are omitted, and their functionality is instead performed by the following modules located in the FCC stage 4: a first channel B servo monitor module 91, a first channel A servo monitor module 92, a second channel B servo monitor module 93, a second channel A servo monitor module 94, a third channel A servo monitor module 95, and a third channel B servo monitor module 96.

The first channel B servo monitor module 91 is collocated with the first FCC 11 and the first command monitor module 61 to provide a first combined FCC/servo monitor module/command monitor module 101.

The first channel A servo monitor module 92 and the second channel B servo monitor module 93 are collocated with the second FCC 12 and the second command monitor module 62 to provide a second combined FCC/servo monitor module/command monitor module 102.

The second channel A servo monitor module 94 is collocated with the third FCC 13 and the third command monitor module 63 to provide a third combined FCC/servo monitor module/command monitor module 103.

The third channel A servo monitor module 95 and the third channel B servo monitor module 96 are collocated with the fourth FCC 14 and the fourth command monitor module 64 to provide a fourth combined FCC/servo monitor module/command monitor module 104.

Also, in this further embodiment, the cross channel sever modules 34, 44 are omitted.

Also, in this further embodiment, the position signal output by the channel A position sensor 24 is now passed, via the channel A combined loop closure and motor drive-control module 50, to the second combined FCC/servo monitor module/command monitor module 102; and the position signal output by the channel B position sensor 26 is now passed, via the channel B combined loop closure and motor drive-control module 52, to the fourth combined FCC/servo monitor module/command monitor module 104.

In this further embodiment, the vote modules 80 and 82 may be located in any appropriate location, for example with or as part of the FCCs or located as a separate entity between the FCCs and the actuator stage.

In further embodiments, the servo monitoring function is instead implemented in the actuator stage 8, with the benefit of avoiding the need for isolation signals from the FCCs to every channel of the actuators. Since the servo monitor should be independent of the actuator processing, in some embodiments a segregated processor is provided within each channel of the actuator. A further advantage of such embodiments is that failure absorption tends to be improved (there are less combinations of failures that lead to catastrophic failures) and also therefore failure analysis tends to be simplified.

Figure 7:
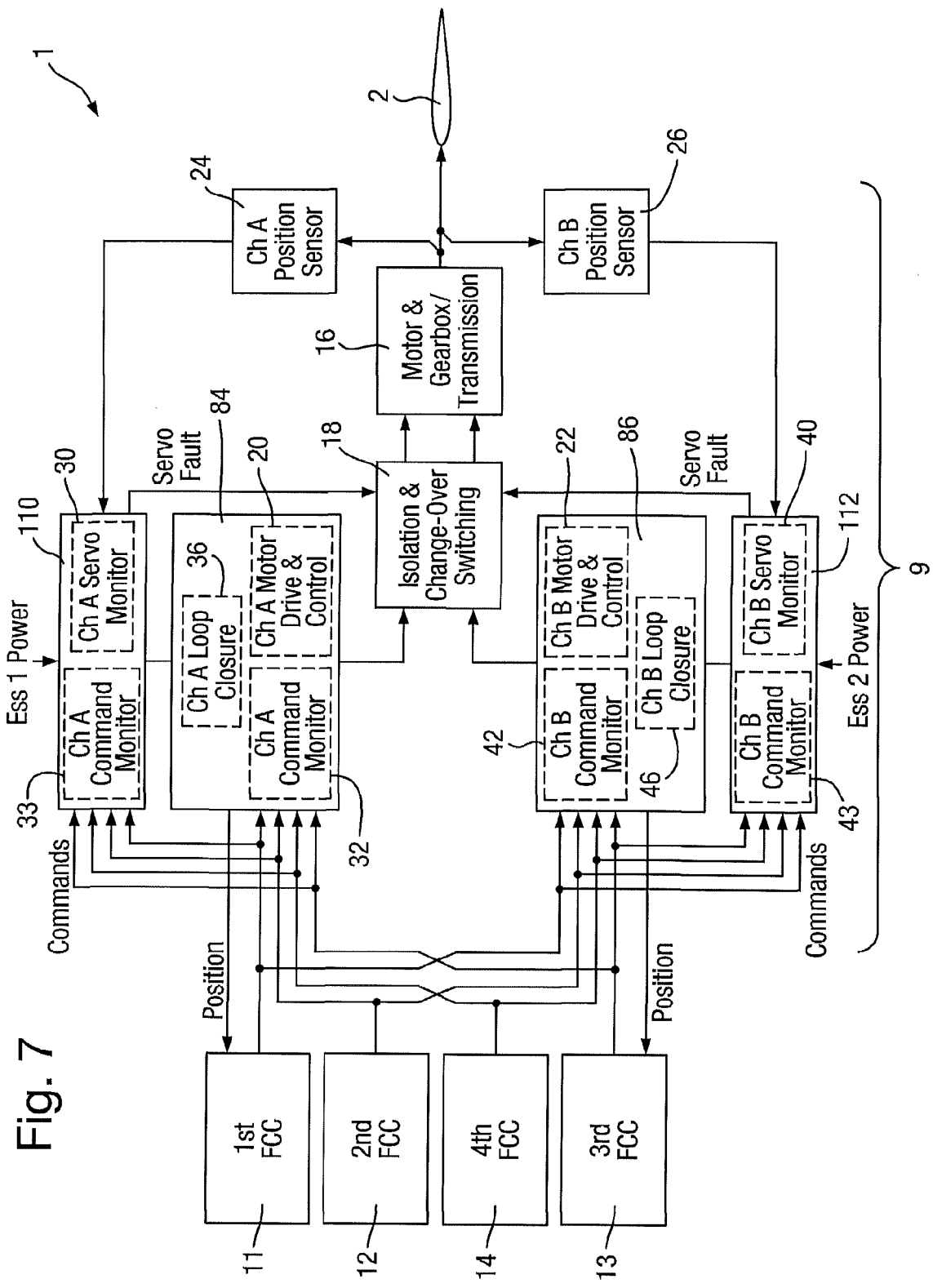

FIG. 7 is a schematic illustration of one such further embodiment of a flight control system 1 for controlling an aerodynamic control surface 2, for example an elevator, aileron, or rudder, of an unmanned air vehicle (UAV), i.e. in the further embodiment shown in FIG. 7, the servo monitor function is instead implemented in the actuator stage, i.e. collocated with the actuator stage, and a segregated processor is provided within each channel of the actuator stage to provide a further version of the actuator control system 9. In the further embodiment of FIG. 7, the flight control system 1 comprises the same elements (indicated by the same reference numerals), and the elements are coupled together and perform the same functions, as in the further embodiment described above with reference to FIG. 5, except where stated otherwise below.

In this further embodiment, in each channel, an additional command monitor module is provided in the actuator stage, and the servo monitor module is collocated with the additional command monitor module to provide a new combined module.

In more detail, and referring to FIG. 7, in this further embodiment a second channel A command monitor module 33 is provided. The channel A servo monitor 30 is collocated with the second channel A command monitor module 33 to provide a combined channel A command monitor/servo monitor module 110. Both the combined channel A command monitor/servo monitor module 110 and the channel A combined loop closure/command monitor/motor drive-control module 84 are located in the actuator stage 8, and are electrically coupled to each other for exchange of signals and power by at least one link. In some embodiments, the combined channel A command monitor/servo monitor module 110 and the channel A combined loop closure/command monitor/motor drive-control module 84 are collocated to provide a further combined module.

In corresponding fashion, in this further embodiment, a second channel B command monitor module 43 is provided. The channel B servo monitor 40 is collocated with the second channel B command monitor module 43 to provide a combined channel B command monitor/servo monitor module 112. Both the combined channel B command monitor/servo monitor module 112 and the channel B combined loop closure/command monitor/motor drive-control module 86 are located in the actuator stage 8, and are electrically coupled to each other for exchange of signals and power by at least one link. In some embodiments, the combined channel B command monitor/servo monitor module 112 and the channel B combined loop closure/command monitor/motor drive-control module 86 are collocated to provide a further combined module.

Thus in this embodiment the actuator control system 9 comprises the following in combination: the combined command monitor/servo monitor modules 110 and 112, the combined loop closure/command monitor/motor drive-control modules 84 and 86, the isolation and change-over switching module 18, the motor and gearbox/transmission module 16, and the position sensors 24 and 26.

The above embodiments advantageously allow for simplification of the interface between the FCC stage and the actuator stage. For example, in the embodiment shown in FIG. 7, the only signals that pass from the FCCs 11, 12, 13, 14 to the actuator stage 8 are control command signals, and the only signals that pass from the actuator stage 8 to the FCCs 11, 12, 13, 14 are position signals.

Apparatus, for implementing the above arrangements, in particular the various functional modules (for example the FCC's, the servo monitor modules, the command monitor modules, the cross channel sever modules, the loop closure modules etc. and combined modules combining two or more of those modules), may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

The above described embodiments may be implemented in, or provided for, any suitable aircraft in which actuators are controlling aerodynamic control surfaces.

The above described embodiments are particularly advantageous in embodiments where the aircraft is a UAV.

The above described embodiments are also advantageously employed in aircraft where multiple safety-critical surfaces and activities may be covered by plural implementations of any given one of the above embodiments, for example in aircraft where arrangement such as the following exist:

Conventional aerodynamic surfaces are used to control the UAV about the pitch, roll and yaw axes.

Control in each axis is implemented by the displacement of plural surfaces, for example four surfaces, whose individual effects are aerodynamically summed to afford the system a degree of failure survival.

The aerodynamic surfaces are positioned by plural, for example twelve, electro-mechanical actuators.

Two or more electrical bus-bars provide power to the actuation sub-system.

In such an embodiment, the above described individual embodiments described with reference to FIGS. 3 to 7, where there are plural FCC channels, two of which are providing position command to plural actuator channels (e.g. channel A and channel B) are replicated, preferably with permutations, amongst the FCC channels for each of the plural surfaces within an axis and for each of the three axes.

The above described embodiments are particularly advantageous in embodiments where the actuators are electromechanical actuators. This is due, at least in part, to the following considerations, which derive from the aspect that electromechanical actuators tend to be more prone to jam in safety-critical positions. The redundancy of the control surfaces in each axis affords the system a degree of protection against actuator failures. The extent of this protection depends upon the nature of the actuator fault. Failures of actuators that result in the surface becoming electrically isolated or stuck in a position near trim are relatively benign and the surface redundancy means that the system can survive two such failures. If an actuator fails such that it becomes stuck in a position critically displaced from null, the remaining surfaces in the affected axis must consume a portion of their control authority in overcoming the stuck surface.

Although in the above embodiments a given number of channels, a given number of FCCs, different types of functional modules, actuators, and the like are used, in other embodiments other numbers of the various elements and modules may be used instead.

It will be appreciated that the terminology FCC encompasses any number of practical computing or processing implementations.

In the above, embodiments of flight control systems were described. It will however be appreciated that, where appropriate, certain constituent elements of those overall flight control systems represent embodiments in themselves. For example, in each example, the actuator control system 9 represents an embodiment in itself. Furthermore, for all these possibilities (including e.g. flight control systems or just the actuator control systems), implementation of just those elements of the failure protection system 6 that relate to just one of the two channels (A or B) represents an embodiment.

It will also be appreciated that for each embodiment described above, a corresponding method also provides an embodiment, by virtue of the functional modules carrying out their functions as is either explicitly or implicitly described above. For example, one such embodiment is an actuator control method for controlling an aerodynamic control surface 2 using the flight control system 1, wherein the flight control system 1 comprises plural FCCs 11, 12, 13, 14 (located in the FCC stage 4), and the actuator stage (8); the method comprising: performing failure protection by performing servo monitoring 30, command monitoring 32, and loop closure function 36; and at least one of the servo monitoring 30, command monitoring 32, and loop closure function 36 are performed in the actuator stage 8.

Another example of such an embodiment is an actuator control method for controlling an aerodynamic control surface 2 using the flight control system 1, wherein the flight control system 1 comprises plural FCCs 11, 12, 13, 14 (located in the FCC stage 4), and the actuator stage (8); the method comprising: performing failure protection by performing servo monitoring 30, command monitoring 32, and loop closure function 36; and, of the servo monitoring 30, command monitoring 32, and loop closure function 36, at least the loop closure function 36 is performed in the actuator stage 8.

Another example of such an embodiment is an actuator control method for controlling an aerodynamic control surface 2 using the flight control system 1, wherein the flight control system 1 comprises plural FCCs 11, 12, 13, 14 (located in the FCC stage 4), and the actuator stage (8); the method comprising: performing failure protection by performing servo monitoring 30, command monitoring 32, and loop closure function 36; and, of the servo monitoring 30, command monitoring 32, and loop closure function 36, at least the command monitoring 32 is performed in the actuator stage 8.

Another example of such an embodiment is an actuator control method for controlling an aerodynamic control surface 2 using the flight control system 1, wherein the flight control system 1 comprises plural FCCs 11, 12, 13, 14 (located in the FCC stage 4), and the actuator stage (8); the method comprising: performing failure protection by performing servo monitoring 30, command monitoring 32, and loop closure function 36; and, of the servo monitoring 30, command monitoring 32, and loop closure function 36, at least the servo monitoring 30 is performed in the actuator stage 8.

Another example of such an embodiment is an actuator control method for controlling an aerodynamic control surface 2 using the flight control system 1, wherein the flight control system 1 comprises plural FCCs 11, 12, 13, 14 (located in the FCC stage 4), and the actuator stage (8); the method comprising performing all of the following in the actuator stage 8: servo monitoring 30, command monitoring 32, and loop closure function 36.

The invention claimed is:

1. A control system for an un-manned vehicle, comprising:
a plurality of control computers each arranged to issue commands over a respective channel to an actuator control system to effect movement of a control surface of the un-manned vehicle, the actuator control system including at least a first control channel for receiving first primary command signals from a first of the plurality of control computers and a second control channel for receiving second primary command signals from a second of the plurality of control computers different to the first control computer; and a command monitor associated with each of the at least first and second control channels for comparing the first and second primary command signals received from the at least first and second control computer, respectively, with commands being issued by another one of the plurality of control computers, different than the first and second control computers, and to output the results of said comparison;

the actuator control system comprising:

for each of the at least first and second control channels, a first driver and a second driver, respectively, wherein the first driver and the second driver are both configured to drive a single actuator linked to the control surface;

a change-over switching mechanism that selects one of the at least first and second control channels to be a selected active control channel for receipt of commands in respect of the control surface; and a channel isolation mechanism that receives the output result from the command monitor associated with the selected active control channel and, in the event that the comparison indicates a potential fault with respect to the selected active control channel, to disengage the selected active control channel and to engage a different one of the at least first and second control channels to be the active control channel for receipt of commands in respect of the control surface.

2. The control system according to claim 1, further comprising a servo monitor associated with each of the at least first and second control channels to monitor signals indicative of a position of the control surface to determine whether the position of the control surface is consistent with commands issued by the at least first and second control computer, respectively, or by a further one of the plurality of control computers and, in the event that a fault is detected, for outputting a signal to prompt disengagement by the channel isolation mechanism of a respective one of the at least first and second control channels if currently selected as the active control channel for the control surface.

3. The control system according to claim 1, wherein the actuator control system further comprises loop closure mechanism for receiving signals indicative of a position of the control surface and for determining an actuator loop error with respect to a commanded position as defined in a command received over the selected active control channel and for generating actuator signals to cause a compensating movement of the control surface.

4. The control system according to claim 1, wherein the change-over switching mechanism is further arranged to select the selected active control channel in dependence upon receipt of a fault indication relating to any one of the at least first driver and the second driver.

5. The control system according to claim 4, further comprising a vote module for receiving the results of the comparison between commands being output by control computers of the plurality of control computers in respect of the control surface and for selecting one of the plurality of control computers, other than the control computer issuing commands over the selected active control channel, to be the another of the plurality of control computers.

6. The control system according to claim 5, wherein the vote module is arranged, on detecting a potential fault on the basis of said received results, to output a signal to prompt severance of a respective control computer and thereby to prompt disengagement or to inhibit engagement of a respective one of the at least first and second control channels by the channel isolation mechanism.

7. The control system according to claim 1, wherein the actuator control system is arranged to control first and second motors in respect of the control surface and the command monitor is configured to determine which of the first and second motors to activate on receipt of a command over the selected active control channel.

8. The control system according to claim 7, wherein the command monitor is further configured to detect a fault in one of the first and second motors and wherein the mechanism to detect determines which of the first and second motors caused the fault and to disengage the respective motor from further activation.

9. The control system according to claim 7, wherein each of the at least first and second actuator drivers is linked to a different electrical power supply.

10. A method for controlling a control surface of an un-manned vehicle, comprising:
(i) generating, using a plurality of independent control computers, command signals defining positional data for a control surface of the vehicle;
(ii) defining at least a first control channel for receiving primary command signals from a first of the plurality of control computers and a second control channel for receiving primary command signals from a second of the plurality of control computers different to the first control computer, wherein for each of the at least first and second control channels, a first driver and a second driver, respectively, are both configured to drive a single actuator linked to the control surface;
(iii) selecting one control channel from the at least first and second control channels to be an active control channel for receipt of command signals in respect of the control surface;
(iv) comparing a command signal received in respect of the control surface from the control computer associated with the active control channel with a corresponding command signal being issued by a third, different one of the plurality of control computers; and
(v) in the event that the comparison at (iv) is indicative of a potential fault in the active control channel, disengaging the active control channel and engaging a different one of the at least first and second control channels to be the active control channel for receipt of command signals in respect of the control surface.

11. The method according to claim 10, wherein (iv) further comprises comparing command signals in respect of the control surface being issued by each of the plurality of control computers and selecting, from the results of the comparison, one of the plurality of control computers, different from the control computer associated with the active control channel, to be the third control computer.

12. The method according to claim 11, further comprising:
(vi) receiving signals indicative of a position of the control surface and determining whether the indicated position of the control surface is consistent with a commanded position defined in a command signal received over the active control channel and, according to the results of the determination, if a potential fault is detected in respect of the active control channel, disengaging the active control channel and engaging a different one of the at least first and second control channels to be the active control channel.

13. The method according to claim 11, wherein (iv) further comprises determining, from the comparing of command signals being issued by each of the plurality of control computers, if a potential fault exists in respect of one of the plurality of control computers and, on detecting a potential fault, generating a signal to trigger disengagement of a respective one or the at least first and second control channels if selected as the active control channel.

14. A computer program product comprising one or more non-transitory computer-readable mediums having encoded thereon executable instructions that, when executed by at least one processor, cause the at least one processor to carry out a process, the process comprising:
(i) generating, using a plurality of independent control computers, command signals defining positional data for a control surface of the vehicle;
(ii) defining at least a first control channel for receiving primary command signals from a first of the plurality of control computers and a second control channel for receiving primary command signals from a second of the plurality of control computers different to the first control computer, wherein for each of the at least first and second control channels, a first driver and a second driver, respectively, are both configured to drive a single actuator linked to the control surface;
(iii) selecting one control channel from the at least first and second control channels to be an active control channel for receipt of command signals in respect of the control surface;
(iv) comparing a command signal received in respect of the control surface from the control computer associated with the active control channel with a corresponding command signal being issued by a third, different one of the plurality of control computers; and
(v) in the event that the comparison at (iv) is indicative of a potential fault in the active control channel, disengaging the active control channel and engaging a different one of the at least first and second control channels to be the active control channel for receipt of command signals in respect of the control surface.

15. The computer program product according to claim 14, wherein (iv) further comprises comparing command signals in respect of the control surface being issued by each of the plurality of control computers and selecting, from the results of the comparison, one of the plurality of control computers, different from the control computer associated with the active control channel, to be the third control computer.

16. The computer program product according to claim 15, further comprising:
(vi) receiving signals indicative of a position of the control surface and determining whether the indicated position of the control surface is consistent with a commanded position defined in a command signal received over the active control channel and, according to the results of the determination, if a potential fault is detected in respect of the active control channel, disengaging the active control channel and engaging a different one of the at least first and second control channels to be the active control channel.

17. The computer program product according to claim 15, wherein (iv) further comprises determining, from the comparing of command signals being issued by each of the plurality of control computers, if a potential fault exists in respect of one of the plurality of control computers and, on detecting a potential fault, generating a signal to trigger disengagement of a respective one or the at least first and second control channels if selected as the active control channel.

\* \* \* \* \*